United States Patent
Rakkolainen et al.

(10) Patent No.: US 11,667,079 B2
(45) Date of Patent: Jun. 6, 2023

(54) STEREOLITHOGRAPHY APPARATUS EQUIPPED WITH SHUTTER COOLING CHANNEL

(71) Applicant: PLANMECA OY, Helsinki (FI)

(72) Inventors: Tero Rakkolainen, Helsinki (FI); Juha Koivisto, Helsinki (FI)

(*) Notice: Subject to any disclaimer, the term of this patent is extended or adjusted under 35 U.S.C. 154(b) by 32 days.

(21) Appl. No.: 17/256,369

(22) PCT Filed: Mar. 11, 2019

(86) PCT No.: PCT/FI2019/050193
§ 371 (c)(1),
(2) Date: Dec. 28, 2020

(87) PCT Pub. No.: WO2020/002753
PCT Pub. Date: Jan. 2, 2020

(65) Prior Publication Data
US 2021/0178683 A1    Jun. 17, 2021

(30) Foreign Application Priority Data
Jun. 28, 2018 (FI) ...................................... 20185593

(51) Int. Cl.
*B29C 64/286* (2017.01)
*B33Y 30/00* (2015.01)
(Continued)

(52) U.S. Cl.
CPC .......... *B29C 64/286* (2017.08); *B29C 64/129* (2017.08); *B29C 64/245* (2017.08);
(Continued)

(58) Field of Classification Search
CPC ... B29C 64/286; B29C 64/245; B29C 64/129; B29C 64/30; B33Y 30/00; B33Y 40/00
(Continued)

(56) References Cited

U.S. PATENT DOCUMENTS 6,097,361 A * 8/2000 Rohner ............... G03F 7/70291
                                                    345/87
2017/0072627 A1* 3/2017 Li ........................ B29C 64/129
2018/0036941 A1* 2/2018 Xu ........................ B29C 64/264

FOREIGN PATENT DOCUMENTS

CN    104786504 A    7/2015
CN    106945281 A    7/2017
(Continued)

OTHER PUBLICATIONS

Haga, JPH08281810A, machine translation, 19961029 (Year: 1996).*
International Search Report for PCT Application No. PCT/FI2019/050193, dated Jun. 19, 2019, 2 pages.

*Primary Examiner* — Joseph S Del Sole
*Assistant Examiner* — Lawrence D. Hohenbrink, Jr.
(74) *Attorney, Agent, or Firm* — Lippes Mathias LLP

(57) ABSTRACT

A stereolitography apparatus comprises a fixed vat (401) or a holder for receiving a removable vat for holding resin during stereolithographic 3D printing, and a radiation source (501) for generating radiation capable of polymerizing portions of said resin in said vat. (401). The apparatus comprises a shutter (502) between said radiation source (501) and said vat (401) for allowing only selected portions of the generated radiation to reach said resin, and a cooling channel (503) between said radiation source (501) and said shutter (502). The apparatus comprises a blower (504) configured to force coolant gas through said cooling channel (503).

10 Claims, 4 Drawing Sheets

(51) Int. Cl.
  *B33Y 40/00* (2020.01)
  *B29C 64/245* (2017.01)
  *B29C 64/129* (2017.01)
  *B29C 64/30* (2017.01)

(52) U.S. Cl.
  CPC .............. *B29C 64/30* (2017.08); *B33Y 30/00* (2014.12); *B33Y 40/00* (2014.12)

(58) Field of Classification Search
  USPC .................................................. 425/472, 375
  See application file for complete search history.

(56) References Cited

FOREIGN PATENT DOCUMENTS

| | | | |
|---|---|---|---|
| JP | H08281810 | * | 10/1996 |
| JP | H08281810 A | | 10/1996 |

* cited by examiner

STEREOLITHOGRAPHY APPARATUS EQUIPPED WITH SHUTTER COOLING CHANNEL

FIELD OF THE INVENTION

The invention concerns the technology of stereolithographic 3D printing, also known as stereolithographic additive manufacturing. In particular the invention concerns the task of controlling a temperature of a shutter in a stereolithography apparatus.

BACKGROUND OF THE INVENTION

Stereolithography is a 3D printing or additive manufacturing technique in which optical radiation is used to photopolymerize suitable raw material to produce the desired object. The raw material comes to the process in the form of a resin. A vat is used to hold an amount of resin, and a build platform is moved in the vertical direction so that the object to be produced grows layer by layer, beginning on a build surface of the build platform. The optical radiation used for photopolymerizing may come from above the vat, in which case the build platform moves downwards through the remaining resin as the manufacturing proceeds. The present description concerns in particular the so-called "bottom up" variant of stereolithography, in which the photopolymerizing optical radiation comes from below the vat and the build platform moves upwards away from the remaining resin as the manufacturing proceeds.

Several approaches are known to generating the photopolymerizing optical radiation in the "bottom up" variant. In one approach a laser beam is scanned through those parts of a currently produced layer in which resin should be photopolymerized. In another approach a pixelized radiation-emitting panel is placed under the bottom of the vat, and only those pixels of the panel are activated that coincide with places where resin should be photopolymerized. Yet another approach involves using a common radiation source, the radiation of which can be evenly distributed across the bottom surface of the vat, and a shutter between said radiation source and said vat for allowing only selected portions of the generated radiation to reach the resin in the vat. The shutter may be controlled electronically so that during the exposure of each layer it becomes transparent at only those locations where radiation should pass through.

The shutter may be for example a liquid crystal panel. A problem may arise, however, because the contrast (difference in transparency between areas that should be transparent and areas that should be opaque) of liquid crystal panels may deteriorate with increasing temperature. In order to enable fast stereolithographic 3D printing a powerful radiation source should be used; however, many powerful sources of suitable radiation produce also relatively large amounts of heat that tends to warm up a liquid crystal panel used as a shutter to prohibitively high temperatures.

OBJECTIVE OF THE INVENTION

An objective of the invention is to solve the problem of excessive heating of the shutter in a stereolithography apparatus in which a common radiation source is used.

SUMMARY

The invention is aimed to present a stereolithography apparatus in which the selective irradiation of those portions of resin that should be photopolymerized can take place fast and effectively. The structure should be advantageous from the viewpoints of manufacturing, use, and maintenance, and it should enable the use of a variety of radiation sources and shutter types.

These and other advantageous aims are achieved by providing one or more cooling channels at a suitable location between the radiation source and forcing coolant gas in sufficient amounts through said cooling channel(s) during the stereolithographic 3D printing process.

According to as an aspect a stereolithography apparatus comprises a vat for holding resin during stereolithographic 3D printing, a radiation source for generating radiation capable of polymerizing portions of said resin in said vat, a shutter between said radiation source and said vat for allowing only selected portions of the generated radiation to reach said resin, a cooling channel between said radiation source and said shutter, and a blower configured to force coolant gas through said cooling channel.

In an embodiment of the stereolithography apparatus said radiation distributor comprises a conical reflector with a narrow end and a wide end, said radiation source is located at said narrow end, and said wide end is directed towards said shutter.

In an embodiment of the stereolithography apparatus said shutter is a panel comprising a layer of electro-optical material.

In an embodiment of the stereolithography apparatus said shutter is a liquid crystal panel.

In an embodiment of the stereolithography apparatus said cooling channel is planar and extends along that side surface of said shutter that is directed away from said vat.

In an embodiment of the stereolithography apparatus said cooling channel is limited by a first planar surface belonging to a structure of said shutter and a second planar surface that is parallel with said first planar surface and displaced from it by a first distance towards said radiation source.

In an embodiment of the stereolithography apparatus it comprises an attenuator of infrared radiation at at least one of said first or second planar surfaces.

In an embodiment of the stereolithography apparatus it comprises an attenuator of infrared radiation within said cooling channel.

In an embodiment of the stereolithography apparatus it comprises a base part and a lid movably coupled to the base part, wherein said vat, said radiation source, said shutter, said cooling channel, and said blower are located in said base part.

It is to be understood that the aspects and embodiments of the invention described above may be used in any combination with each other. Several of the aspects and embodiments may be combined together to form a further embodiment of the invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
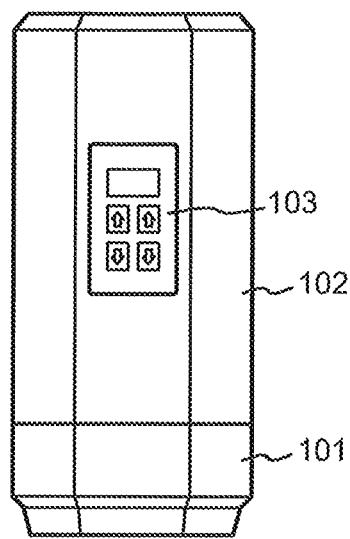
FIG. 1 illustrates a stereolithography apparatus in a front view with its lid closed.
Figure 2:
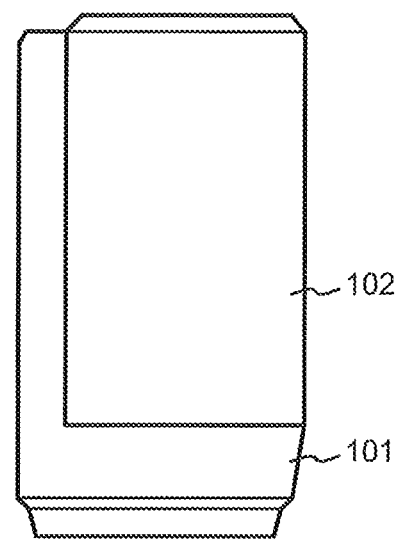
FIG. 2 illustrates a stereolithography apparatus in a side view with its lid closed.

FIGS. 1 to 4 illustrate an example of a stereolithography apparatus. The apparatus could also be called a stereolithographic 3D printer, or a stereolithographic additive manufacturing apparatus. Basic parts of the apparatus are a base part 101 and a lid 102, of which the lid 102 is movably coupled to the base part 101 so that it can move between a closed position shown in FIGS. 1 and 2 and an open position shown in FIGS. 3 and 4. Here the direction of the movement is vertical, but this is not a requirement; the movement of the lid 102 in relation to the base part 101 could take place in other directions. An important advantage of a movable lid of this kind is that an ongoing stereolithographic 3D printing process can be protected from any interfering external optical radiation by closing the lid 102.

A vat 401 is provided in the base part 101 for holding resin for use in the stereolithographic 3D printing process. If the vat 401 is not a fixed part of the stereolithography apparatus, the base part 101 may comprise a holder for receiving a removable vat. The holder may be for example a table 405 having an essentially horizontal upper surface on which a vat 401 is placeable. Additionally or alternatively the holder may comprise support rails, alignment aids, locking mechanisms, and/or other comparable means configured to support a vat and/or to ensure that it assumes and remains in the appropriate location. In this description all references to the vat 401 are to be understood to cover both a fixed vat arrangement and an arrangement in which a removable vat 401 can be received in a holder of said kind.

A build platform 402 with a build surface 403 is supported above the vat 401 so that the build surface 403 faces the vat 401. This arrangement is typical to the so-called "bottom up" variant of stereolithography, in which the photopolymerizing radiation comes from below the vat. The bottom of the vat 401 is or can be selectively made transparent or translucent for the kind of radiation used for said photopolymerizing.

A moving mechanism is provided and configured to move the build platform 402 in a working movement range between first and second extreme positions. Of these, the first extreme position is the one proximal to the vat 401, and the second extreme position is the one distant from the vat 401. In the first extreme position the build surface 403 is very close to the bottom of the vat 401. The first layer of the object to be manufactured will be photopolymerized onto the build surface 403 when the build platform 402 is in the first extreme position. Consequently, in said first extreme position the distance between the build surface 403 and the bottom of the vat 401 is in the order of the thickness of one layer in the stereolithographic 3D printing process.

Figure 3:
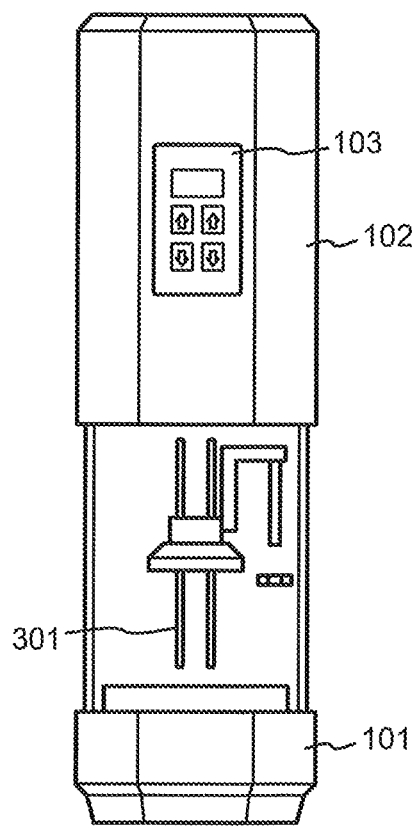
FIG. 3 illustrates a stereolithography apparatus in a front view with its lid open.
Figure 4:
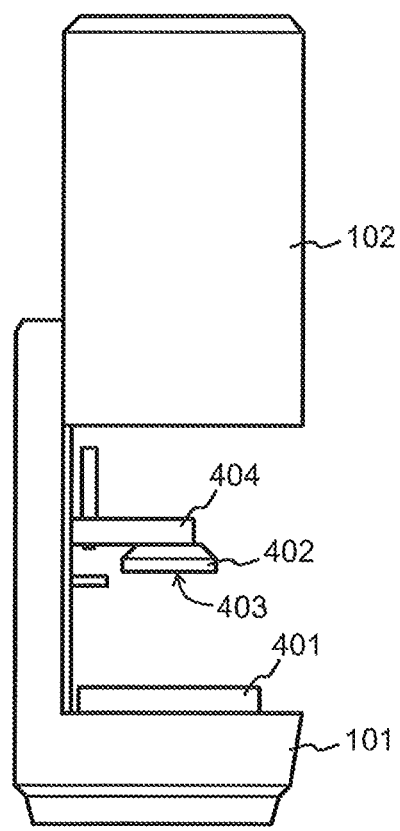
FIG. 4 illustrates a stereolithography apparatus in a side view with its lid open.

The position shown in FIGS. 3 and 4 may be the second extreme position, or at least closer to the second extreme position than to the first extreme position. A working region of the stereolithography apparatus may be said to exist between the vat 401 and the second extreme position of the build platform 402, because the object to be manufactured will appear within this region. The build platform 402 does not need to move up to or even close to the second extreme position during the manufacturing of an object; the second extreme position may be most useful for making it easier to detach a manufactured object from the build platform 402 once the object is complete.

In the embodiment of FIGS. 1 to 4 the moving mechanism for moving the build platform 402 is inside the base part 101, and only represented by the two slits 301 seen in a vertical surface of the base part 101, as well as the horizontal support 404 of the build platform 402. There is also a similarly hidden moving mechanism for moving the lid 102 with respect to the base part 101. This second moving mechanism may comprise parts inside the base part 101 and/or parts inside the lid 102. Enclosing essentially all moving mechanisms within the casings of the base part 101 and/or the lid 102 involves the advantage of added safety, because it makes it improbable that a user could get injured by any moving parts of such mechanisms.

The horizontal support 404 of the build platform 402 is shown only schematically in the drawings. In a practical implementation a support of the build platform 402 may comprise various advanced technical features, like joints and/or fine tuning mechanisms for ensuring that the orientation of the build surface 403 is appropriate. However, such features are out of the scope of this description and are therefore omitted here.

Another feature of the exemplary stereolithography apparatus of FIGS. 1 to 4 is a user interface, which in this example comprises a touch-sensitive display 103 in the lid 102. The user interface may comprise various functions for implementing interactions between the apparatus and its user, including but not being limited to buttons for controlling the movements of the lid 102 and the build platform 402. A touch-sensitive display is an advantageous feature of a user interface in particular if the stereolithography apparatus is to be used in environments where thorough cleaning and disinfecting are regularly required, like at medical and/or dental clinics. Placing a touch-sensitive display 103 and/or other parts of the user interface in a front part of the lid 102 is advantageous, because it makes such parts of the user interface easily accessible to the user. As such, at least some parts of the user interface could be implemented in the base part 101. Yet another possibility is to implement at least a part of the user interface in a suitably programmed portable user device, like a tablet or smartphone, so that short-distance wired or wireless communications are set up between the stereolithography apparatus and the portable user device.

Figure 5:
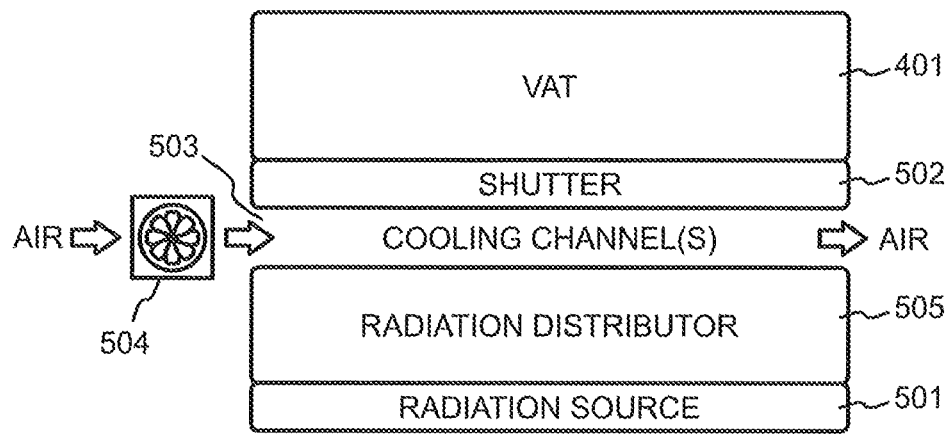
FIG. 5 illustrates a cooling principle.

FIG. 5 is a schematic illustration of a cooling principle. As explained above, the stereolithography apparatus comprises a fixed or removable vat 401 for holding resin during stereolithographic 3D printing. A radiation source 501 is provided for generating radiation that is capable of polymerizing portions of said resin in said vat 401. The radiation is capable of this purpose when it is sufficiently intensive on those wavelengths that are known to cause the desired photopolymerizing reaction in resins that are used for stereolithographic 3D printing, and when the mutual locations of the radiation source 501 and the vat 401 are such that sufficient amounts of the radiation emitted by the radiation source 501 can reach the desired portions of the resin in the vat 401.

A shutter 502 is provided at a suitable location between the radiation source 501 and the vat 401 for allowing only selected portions of the generated radiation to reach the resin in the vat 401. In order to avoid diffraction-induced inaccuracy in the borderlines between photopolymerized and unpolymerized resin, it is advantageous to place the shutter 502 as close to the currently affected layer of resin as possible. The "bottom up" variant of stereolithography is considered here, which means that the shutter 502 is most advantageously under the bottom surface of the vat 401 and as close to it as possible. In typical applications of the "bottom up" variant of stereolithography the build surface of the build platform is planar, and consequently also the bottom of the vat 401 and the shutter 502 are both planar.

The radiation source 501 may cause heating of the shutter 502 through radiation that becomes absorbed in the shutter 502. Another cause of heating may be radiation that becomes absorbed in some other structure close to the shutter 502 and consequently causes conductive heating of the shutter 502. It is also possible that heat is conducted all the way from the radiation source 501 itself to the shutter 502 through any intermediate structures therebetween. A further possibility is convective heating, which means that the radiation source 501 heats up the immediately surrounding air, which then flows towards the shutter 502 and heats up either the shutter itself of some surrounding structure from which the heat is eventually conducted to the shutter 502.

In order to counteract the effect of any such heating, the stereolithography apparatus—parts of which are schematically illustrated in FIG. 5—comprises one or more cooling channels 503 between the radiation source 501 and the shutter 502. A cooling channel is generally defined as a passage through which a fluid cooling medium may flow. Liquids, such as water, may have a relatively high specific heat capacity and are therefore relatively efficient for use as fluid cooling mediums. However, in the particular framework of stereolithographic 3D printing they have also disadvantages. Water, for example, attenuates quite strongly ultraviolet radiation, i.e. the wavelengths that should pass through to the desired portions of resin to cause photopolymerization. Gas bubbles may form in water when it gets heated, which causes anomalies in the propagation of radiation through the water. Water may leak into unwanted parts in the apparatus or even out of the apparatus, which in turn may cause all kind of harm and even hazards.

For these reasons it has been considered more advantageous to use a coolant gas as the fluid cooling medium. The most readily available coolant gas is air. As illustrated schematically in FIG. 5, air can be made to flow through the cooling channel(s) 503 by providing suitable air inlets and outlets. In order to ensure sufficient flow of air it is advantageous to equip the stereolithography apparatus with a blower 504 that is configured to force air through said cooling channel(s) 503. In the schematic illustration of FIG. 5 the blower 504 is shown at or close to the inlet of the cooling channel(s) 503, so that it blows air into the cooling channel(s) 503. Additionally or alternatively a blower could be used at or close to the outlet of the cooling channel(s) 503, so that it would draw air from the cooling channel(s) 503.

The most important cooling mechanism achieved with a forced flow of coolant gas is forced heat convection, which means that the coolant gas absorbs heat from the walls of the cooling channel(s) and transports the absorbed heat away when it flows through the outlet(s) of the cooling channel(s). Forced heat convection works the most effectively when the temperature difference is large between the surface to be cooled and the fluid cooling medium flowing past it, and when the flow of the fluid cooling medium is strong and turbulent. A strong flow is easy to take care of by providing a sufficiently powerful blower 504 and a sufficiently large cross section of all channels through which the coolant gas must flow. In order to make the temperature difference larger it is possible to equip the stereolithography apparatus with a precooler, through which the coolant gas is made to flow before it flows into the cooling channel(s) 503. Precoolers of various kinds are known as such and are therefore not described here in more detail. In order to make the flow turbulent the cooling channel(s) may be designed with some internal features and/or dimensions that disturb any otherwise laminar flow and cause turbulence.

Another optional feature of the stereolithography apparatus that is schematically shown in FIG. 5 is the radiation distributor 505 between the radiation source 501 and the cooling channel(s) 503. Whether one is used depends on the overall approach to generating the radiation that should selectively photopolymerize the resin. In the approach proposed here, spatially a relatively small radiation source is used to actually generate the radiation, and a radiation distributor 505 takes care of distributing the generated radiation evenly across all parts of the area where photopolymerization is to take place.

In addition to distributing the generated radiation, the use of a radiation distributor 505 may have an advantageous effect on preventing the excessive heating of the shutter 502. Namely, it increases the distance between the radiation source 501 and the shutter 502, allowing the heat generated by the radiation source 501 to spread more so that a smaller portion of the generated heat actually has the risk of reaching the shutter 502 and causing it to heat up.

Figure 6:
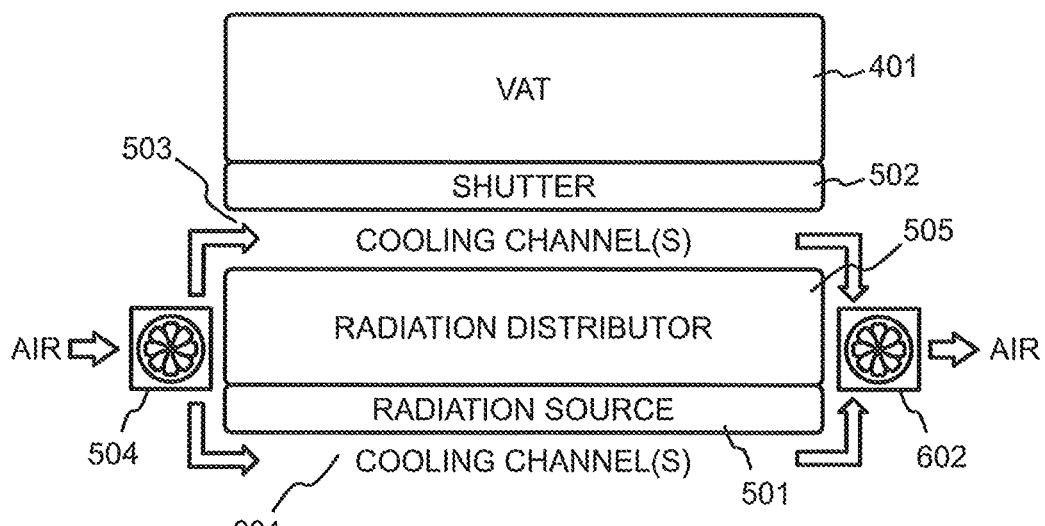
FIG. 6 illustrates another cooling principle.

FIG. 6 is a schematic illustration of a slightly different stereolithography apparatus. In the embodiment of FIG. 6 the vat 401, the radiation source 501, the shutter 502, the cooling channel(s) 503 between the radiation source and the shutter, the blower 504, and the radiation distributor 505 may be similar to those explained above with reference to FIG. 5. As a difference there are also one or more cooling channels 601 in more direct connection with the radiation source 501, so that heat generated there can be transported out through forced heat convection before it gets closer to the shutter 502. Another additional feature shown schematically in FIG. 6 is the provision of another blower 602, the task of which is to draw coolant gas from the cooling channel(s) 503 and/or 601 in addition to (or in place of) blowing coolant gas into them with the blower 504.

Figure 7:
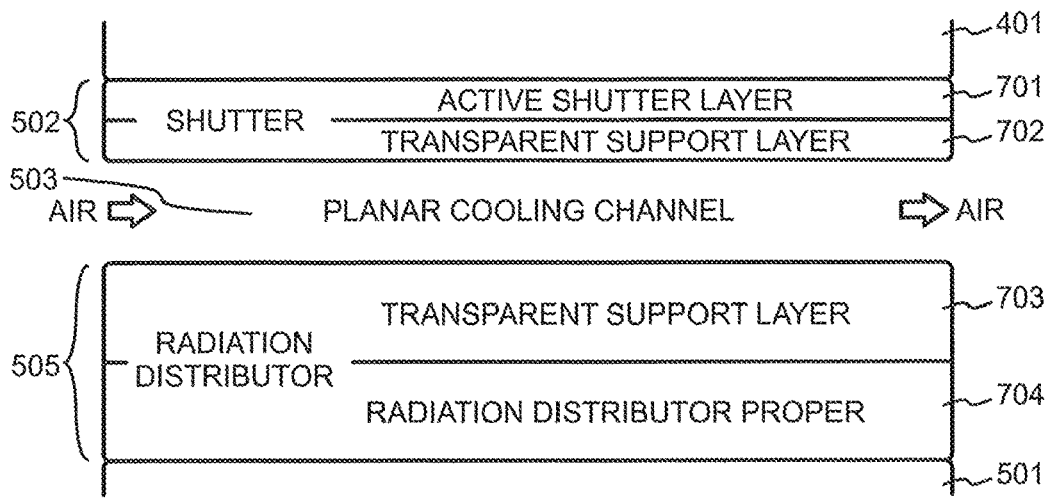
FIG. 7 illustrates an embodiment of a structure.

FIG. 7 illustrates a principle according to which the shutter 502 may comprise an active shutter layer 701, in which the actual selective changing between transparency and opaqueness takes place, and a transparent support layer 702 that is needed to mechanically support the active shutter layer. This kind of a structure is used for example when the shutter is a panel comprising a layer of electro-optical material. The electro-optical material constitutes the active shutter layer 701, and the transparent support layer 702 is for example a glass plate, on one surface of which the electro-optical material has been deposited. A shutter comprising a layer of electro-optical material may be for example a liquid crystal panel.

Electro-optical materials in general, and liquid crystal materials in particular, involve the advantage that their transparency/opaqueness to ultraviolet radiation can be controlled very precisely when they have been deposited with the appropriate pixelated structure. Also, the technology of selectively controlling the pixelated transparency/opaqueness of electro-optical materials is a quite well established technology, making it relatively straightforward to find components and control systems suitable for this purpose in a stereolithography apparatus.

In order to minimize the distance between the active shutter layer 701 and the resin to be selectively photopolymerized in the vat 401, it is advantageous to place the active shutter layer 701 on that side surface of the shutter 502 that is directed towards the vat 401. In the embodiment of FIG. 7 the cooling channel 503 is planar and extends along that side surface of the shutter 502 that is directed away from the vat 401. A planar cooling channel of this kind involves the advantage that it causes minimal obstruction and distortion to the radiation that should pass through to the resin in the vat 401.

The planar cooling channel of FIG. 7 is thus limited by a first planar surface belonging to a structure of the shutter 502. Said first planar surface is the lower surface of the transparent support layer 702 in FIG. 7. On the other side the planar cooling channel of FIG. 7 is limited by a second planar surface that is parallel with said first planar surface and displaced from it by a first distance towards the radiation source 501. In the exemplary structure of FIG. 7 this is the upper surface of another transparent support layer 703, which together with the radiation distributor proper 704 belong to the structure that was above referred to in general as the radiation distributor 505.

The efficiency of forced heat convection can be enhanced by ensuring that the unwanted radiated heat, i.e. the infrared radiation generated in the radiation source 501, becomes absorbed in places where it causes as little heating up of the shutter as possible, and/or from which it is as easy to remove as possible. Attenuators of infrared radiation can be used for such purposes. In the present context an attenuator of infrared radiation is a piece or layer of material that absorbs infrared radiation relatively effectively, while simultaneously being as transparent as possible to radiation on those wavelengths that cause photopolymerization.

Figure 8:
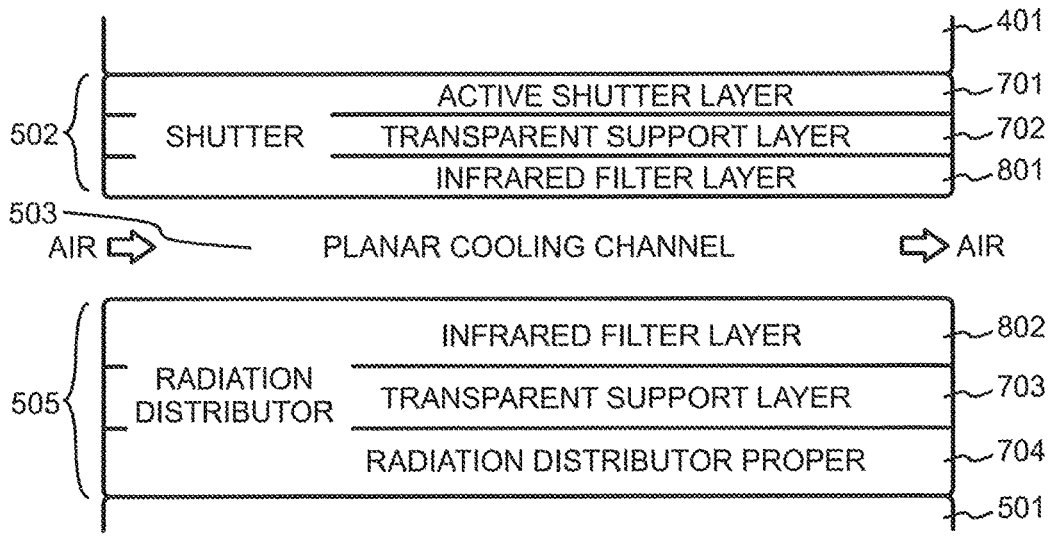
FIG. 8 illustrates an example of infrared attenuators.
Figure 9:
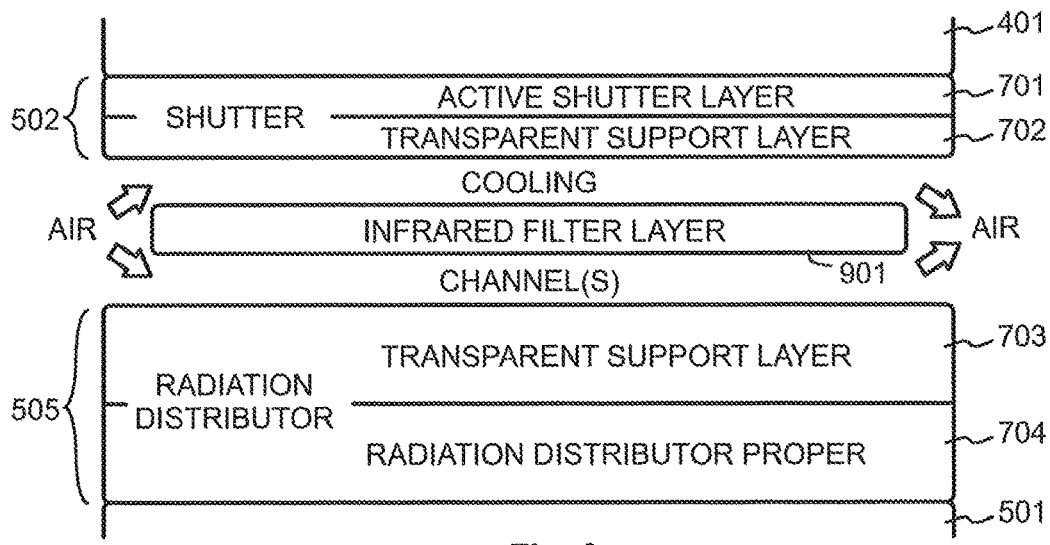
FIG. 9 illustrates another example of infrared attenuators.

FIGS. 8 and 9 illustrate examples of principles how one or more attenuators of infrared radiation could be placed in the stereolithography apparatus. The structure shown in FIG. 8 is otherwise the same as in FIG. 7, but it comprises an attenuator of infrared radiation at at least one of the first or second planar surfaces mentioned above: the first infrared filter layer 801 is on the lower surface (i.e. the cooling channel side surface) of the first transparent support layer 702, and the second infrared filter layer 802 is on the upper surface (i.e. the cooling channel side surface) of the second transparent support layer 703. These embodiments involve the advantage that no separate support structures are needed for the infrared filter layer(s). In FIG. 9 the stereolithography apparatus comprises an attenuator 901 of infrared radiation within the cooling channel, as an intermediate layer that at least partly divides the cooling channel in two. This embodiment involves the advantage that heat absorbed in the attenuator 901 does not easily get conducted to other parts of the structure but remains to become transported away through forced heat convection.

Figure 10:
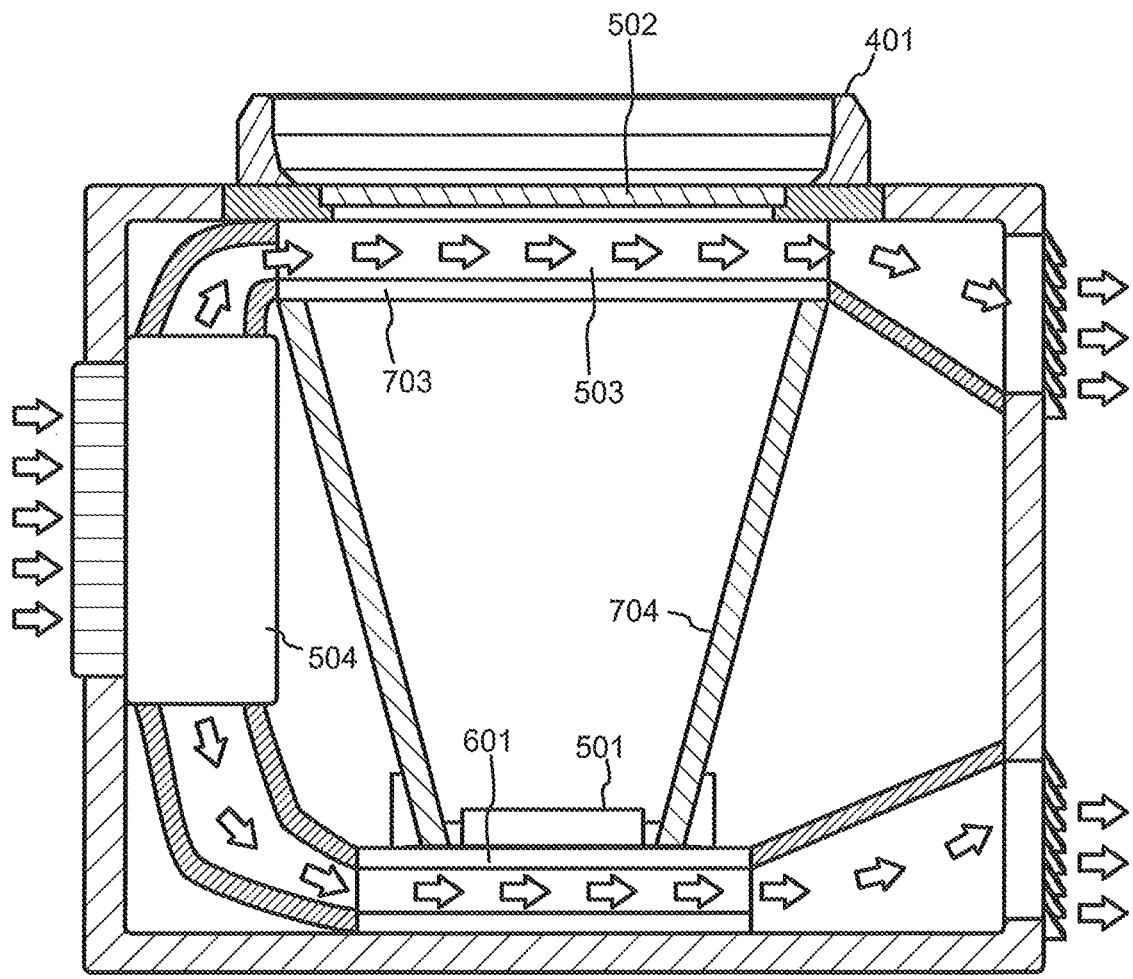
FIG. 10 illustrates a base part of a stereolithography apparatus.

FIG. 10 is a schematic cross section of an example of a lower portion of a base part in a stereolithography apparatus. The stereolithography apparatus comprises a vat 401 for holding resin during stereolithographic 3D printing, and a radiation source 501 for generating radiation capable of polymerizing portions of said resin in said vat 401. The stereolithography apparatus comprises a shutter 502 between said radiation source 501 and said vat 401 for allowing only selected portions of the generated radiation to reach said resin. The stereolithography apparatus comprises a cooling channel 503 between said radiation source 501 and said shutter 502, and a blower 504 configured to force air or some other coolant gas through said cooling channel 503. In this embodiment there is also a second cooling channel that goes below the radiation source 501.

In the embodiment of FIG. 10 the radiation distributor comprises a conical reflector as the radiation distributor proper 704. The conical reflector has a narrow end and a wide end, so that the radiation source 501 is located at the narrow end and the wide end is directed towards the shutter 502. A transparent support layer 703 covers the wide end, limiting the cooling channel 503 from below. This kind of a conical reflector has several advantages as a radiation distributor. It provides a very smooth and even distribution of radiation across the whole lower surface of the shutter 502, and it also provides a relatively long physical distance between the radiation source 501 and the shutter 502, which helps to spread out the waste heat.

The blower 504 can be taken to mean any device, the purpose and effect of which is to produce a forced flow of coolant gas through one or more cooling channels. According to an embodiment, the blower 504 may be a cooling fan of similar kind that is used in tabletop size electronic devices, like desktop computers. It may operate at standard speed whenever the stereolithography apparatus has its operating power switched on. Alternatively or additionally the stereolithography apparatus may comprise a control system with one or more temperature sensors configured to measure a temperature of the shutter 502 and/or the temperatures of structural parts, the temperatures of which are closely related to and thus indicative of the temperature of the shutter 502. Such a control system can be used to selectively activate the blower 504 and/or to select its rotating speed so that the shutter 502 can be maintained in a desired temperature. If the stereolithography apparatus comprises a user interface, the user interface may give indications to the user about matters related to the temperature of the shutter 502. For example, the user interface may alert the user when the shutter 502 has warmed up too much, and prompt the user to wait for a certain time in order to allow the shutter 502 to cool down before the next stereolithographic 3D printing job can begin.

It is obvious to a person skilled in the art that with the advancement of technology, the basic idea of the invention may be implemented in various ways. The invention and its embodiments are thus not limited to the examples described above, instead they may vary within the scope of the claims. For example, even if air has been described as the fluid cooling medium that flows through the cooling channels, some other gaseous medium could be used if available. In some cases the stereolithography apparatus could comprise a closed circulation for a coolant gas other than air.

The invention claimed is:

1. Stereolithography apparatus, comprising:
a fixed vat or a holder for receiving a removable vat for holding resin during stereolithographic 3D printing,
a radiation source for generating radiation below the vat, said radiation being capable of polymerizing portions of said resin in said vat,
a shutter between said radiation source and said vat for allowing only selected portions of the generated radiation to reach said resin,
a first cooling channel between said radiation source and said shutter to provide cooling of said shutter, and
a blower configured to force coolant gas through said first cooling channel, wherein the stereolithography apparatus comprises a second cooling channel in more direct connection with the radiation source than said first cooling channel, and said blower is configured to force coolant gas through said second cooling channel to provide cooling of said radiation source.

2. A stereolithography apparatus according to claim 1, comprising a radiation distributor between said radiation source and said first cooling channel.

3. A stereolithography apparatus according to claim 2, wherein:
said radiation distributor comprises a conical reflector with a narrow end and a wide end,
said radiation source is located at said narrow end, and
said wide end is directed towards said shutter.

4. A stereolithography apparatus according to claim 1, wherein said shutter is a panel comprising a layer of electro-optical material.

5. A stereolithography apparatus according to claim 4, wherein said shutter is a liquid crystal panel.

6. A stereolithography apparatus according to claim 1, wherein said first cooling channel is planar and extends along that side surface of said shutter that is directed away from said vat.

7. A stereolithography apparatus according to claim 6, wherein said first cooling channel is limited by a first planar surface belonging to a structure of said shutter and a second planar surface that is parallel with said first planar surface and displaced from the first planar surface by a first distance towards said radiation source.

8. A stereolithography apparatus according to claim 7, comprising an attenuator of infrared radiation at at least one of said first or second planar surfaces.

9. A stereolithography apparatus according to claim 1, comprising an attenuator of infrared radiation within said first cooling channel.

10. A stereolithography apparatus according to claim 1, comprising:
a base part, and
a lid movably coupled to the base part,
wherein said vat, said radiation source, said shutter, said first cooling channel, and said blower are located in said base part.

* * * * *